Patented Aug. 28, 1945

2,383,547

UNITED STATES PATENT OFFICE 2,383,547

ABSORPTION AND RECOVERY OF ACETYLENE BY A CRYOGENIC METHOD

William H. Hamill and Richard R. Vogt, Notre Dame, Ind., assignors to E. I. du Pont de Nemours & Company, Wilmington, Del., a corporation of Delaware No Drawing. Application October 15, 1940, Serial No. 361,274

2 Claims. (Cl. 183—115)

This invention relates to the absorption of acetylene. More particularly, it relates to a process for the absorption and recovery of acetylene by a cryogenic method.

Numerous inventors have disclosed selective solvents for acetylene adapted to the separation of acetylene from mixtures with other gases, particularly pyrolysis gases, for its recovery and enrichment. It has been shown that acetylene may be absorbed in liquids such as acetone in unexpectedly high concentrations and successively recovered by degassing at elevated temperature and reduced pressure. These processes have been commercially applied for the storage of acetylene and for its recovery from dilute mixture in other gases, but their application is limited by solvent losses and by the cost of power necessary to carry out the temperature or pressure cycle.

Acetylene can be produced cheaply by pyrolysis of other hydrocarbon materials either thermally or by electric processes, but, in so doing, it is also accompanied by relatively large volumes of by-product gases, such as hydrogen, ethane, ethylene, etc.

The objects of this invention are to devise new processes for the separation of acetylene from such gases and for its storage. A further object is to devise a method of separation and storage in which the cycle can be operated with minimum loss of solvents and low power consumption. Other objects will appear herein below.

These objects have been accomplished by the discovery of a new acetylene absorption cycle which involves absorbing the acetylene in a selective solvent and then freezing the resulting solution, whereby the acetylene is recovered in a gaseous form. This will be referred to as the cryogenic method.

In accord with the prior art, acetylene is absorbed in numerous suitable solvents, the capacity of the solvents increasing with decrease in temperature. We have discovered the unexpected fact, however, that, as the temperature is farther lowered, the acetylene is suddenly disengaged and released from solution, with the accompanying freezing of the solvent. We have practically utilized this unexpected discovery for the storage and separation of acetylene by the simple procedure of absorbing acetylene in the solvent at some temperature above its freezing point and subsequently liberating the acetylene from solution by freezing.

In order that the process may be more fully understood, the following specific examples are given. Such examples are merely by way of illustration. The invention is not limited thereto, but suitable variations may be made as will become more apparent hereinafter.

Example I

One hundred (100) volumes of dioxane was cooled to a temperature slightly above its freezing point (approximately 10° C.) in a closed vessel equipped with a gas inlet tube and vigorous agitation. Acetylene at about 760 mm. pressure was passed into the dioxane while stirred until saturated. Measurement of the acetylene absorbed showed that approximately 2,400 volumes was in the cooled dioxane solution. If desired, the acetylene may be stored in the form of this solution. On freezing, this dioxane solution with agitation to prevent entrapping the gas, 2,400 volumes of acetylene was recovered.

Example II

Impure acetylene was passed up through an absorption tower counter-current to a stream of dioxane at about 10° C. and 760 mm. pressure and at a rate of 20 volumes of gas per volume of solvent. The input gas had the following composition (parts by volume):

|  | Per cent |
|---|---|
| $C_2H_2$ | 12.9 |
| $C_2H_4$ | 19.5 |
| $C_2H_6$ | 18.8 |
| $H_2$ | 45.3 |
| Other gases | 3.5 |

After contact with the solvent, the effluent gas had the following composition:

|  | Per cent |
|---|---|
| $C_2H_2$ | 1.1 |
| $C_2H_4$ | 18.9 |
| $C_2H_6$ | 22.2 |
| $H_2$ | 53.6 |
| Other gases | 4.2 |

The solvent leaving the absorption tower was passed into the second vessel in which it was frozen by lowering its temperature. The composition of the disengaged gas from the solvent was approximately

|  | Per cent |
|---|---|
| $C_2H_2$ | 77.5 |
| $C_2H_4$ | 22.5 |

Example III

The enriched acetylene obtained in the process of Example II was again contacted with dioxane in an absorption column in the manner of Example II. In this case, the effluent gas from the absorption tower was essentially ethylene and, upon freezing the solvent, the disengaged gas had the composition

| | Per cent |
|---|---|
| C₂H₂ | 94.8 |
| C₂H₄ | 5.2 |

Example IV

A third absorption cycle was applied to the enriched acetylene from Example III and the acetylene obtained upon freezing was found to be over 99 per cent pure, the balance being essentially ethylene.

Example V

The process of Example I was repeated using a temperature of 5° C. for the absorption of the acetylene. Three thousand (3000) volumes of acetylene was absorbed in the 100 volumes of solvent and was practically quantitatively recovered on freezing. This illustrates how, by virtue of the lowering of the freezing point of the dioxane solution by the dissolved acetylene, it is possible to work at a temperature somewhat below the freezing point of the pure solvent and thus take advantage of the greater solubility at this temperature. By working at a pressure of 1040 mm., 4300 volumes of acetylene was absorbed and recovered.

The dioxane used in Example I may, of course, be replaced by other solvents, particularly those of the type more fully described hereinafter. The following table gives the volumes of acetylene at atmospheric pressure absorbed by 100 volumes of several other typical solvents together with the temperature used.

| Substance | Volumes | Temperature |
|---|---|---|
| | | °C. |
| Acetyl morpholine | 3,000 | 5 |
| Carbo methoxy morpholine | 2,400 | 0 |
| Acetonyl acetone | 2,400 | 5 |
| Ethyl succinimide | 1,500 | 15 |
| Anethole | 1,200 | 15 |
| Paraldehyde | 1,200 | 10 |
| Glycol carbonate | 800 | 20 |

The process of Example II may be made completely continuous as follows: The solution which has been in contact with the gas is removed continuously from the bottom of the absorption tower and passed into a vessel, in which a drum which is internally cooled to a temperature several degrees below the melting point of the solution (for example, 0° C. in the case of dioxane), rotation about a horizontal axis in such a way as to be only partly immersed in the solution. A layer of solution in contact with this drum is thus caused to freeze with the liberation of the dissolved gas. The frozen layer of the solvent upon the drum is thus removed from the solution and is scraped off by a knife, melted, and returned to the top of the absorption tower. At the same time, the liberated gas is continuously removed. By adjusting the size and rate of rotation and temperature of the drum, the liberated gas and recovered pure solvent may be formed at a rate corresponding to the removal of the acetylene solution from the absorption tower.

Although any solvent capable of dissolving acetylene will function, the best results are obtained with those which have a high absorptive capacity in the liquid state, a very small absorptive capacity in the solid state, a freezing point in a suitable range as is more fully discussed below, and a high selective action toward acetylene. We have found that those solvents best suited for the process contain oxygen or nitrogen or both and contain one or more atoms which are capable of readily losing electrons or, in other words, atoms which are electron-donor atoms. Furthermore, these compounds should, preferably, contain no labile hydrogen more acidic than the hydrogen of acetylene and should have a closely knit crystalline lattice in the solid state. Heterocyclic organic compounds containing, in the ring, at least two atoms of the group consisting of oxygen and nitrogen, constitute a quite useful type of solvent. Among the solvents possessing the characteristics suitable for acetylene absorption, compounds of the following types may be mentioned:

Glycol carbonate
Ethylene derivative of N-methyl carbamic acid
Ethylene derivative of N,N'-dimethyl urea
Glycol oxalate
Ethylene derivative of N,N'-dimethyl oxamide
Ethylene derivative of N-methyl oxamic acid
Glycol ether ester of glycolic acid
Ethylene derivative of glycolic acid N-methyl amide
Dioxane
N-acetyl morpholine
N-formyl morpholine
N-carbomethoxy morpholine
N-carboethoxy morpholine
N-carbopropoxy morpholine
N-methyl morpholine
N,N'-dimethyl pyrimidine
Diglycolide
N-methyl succinimide
Acetonyl acetone
Furfuryl acetone
Acetophenone
Gamma-pyrone
Dimethyl carbonate
N-dimethyl carbamic acid methyl ester
Tetramethyl urea
Dimethyl oxalate
N-dimethyl oxamic acid methyl ester
Tetramethyl oxamide
N,N'-dimethyl amide of glycolic acid methyl ether
Dimethyl acetamide
Glycol diacetate
Paraldehyde
Ethylene glycol acetal
Ethylidene ether ester of glycolic acid
Anethole
Safrole The term "ethylene derivative" is used above to describe compounds in which the divalent radical —CH₂—CH₂— replaces 2 hydrogen atoms attached to oxygen or nitrogen of the parent substance. Thus, the ethylene derivative of N-methyl carbamic acid has the structure

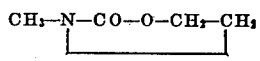

and is systematically known as 1-methyl-2-oxazolidone. Similarly, the ethylene derivative of N,N'-dimethyl urea has the structure

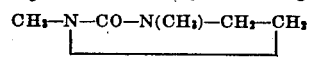

and is known as 1,3-dimethyl-2-imid azolidone, and the derivative of N,N'-dimethyl oxamide, which has the structure

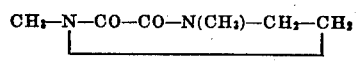

and is known as 1,4-dimethyl-2,3-piperazine dione. Also included among the suitable solvents are homologues of the compounds given in the above list. Thus, by the use of appropriate homologues, it is often possible to alter the physical properties such as the melting point in accordance with the requirements discussed below without substantial change in absorptive capacity. Mixtures of solvents may also be used for the same purpose.

Of the solvents mentioned above, dioxane is particularly adapted for the process of this invention.

Since the feature of this invention is the recovery of acetylene by freezing the solvent after absorption, it is desirable to have a solvent possessing a freezing point in a convenient temperature range. As in other processes of the known art, the capacity of the solvents for the absorption of acetylene decreases with increase in temperature, therefore, though it is within the scope of the invention, it is not particularly desirable to have solvents with too high freezing points. On the other hand, though the capacity of the solvent is greatly increased, at greatly reduced temperature, the cost of refrigeration required for freezing makes it undesirable to have solvents freezing substantially below room temperature. A preferred range, therefore, are solvents freezing between $-10°$ C. and $+50°$ C.

The temperature range in which the process of this invention may be carried out is not critical. As has been stated, the capacity of solvents is dependent upon the temperature, but the process is operable within almost any range. Obviously, since the capacity increases with decrease in temperature, it is desirable to carry out the absorption at or slightly above the freezing point of the solvent.

Since the capacity of the solvent is increased by increase in pressure, it may be desirable under suitable conditions to absorb at pressure exceeding atmospheric within the limits of safety in handling acetylene. The pressure of absorption is not critical, and the upper limit of pressure is restricted only by safety. On the other hand, degassing is more rapid and more complete at low pressure. The practical method of operation, therefore, is to absorb acetylene at super-atmospheric pressure and degas by freezing at atmospheric or even sub-atmospheric pressure.

There are many advantages of this new discovery. First, it is possible to carry out the absorption and recovery cycle with low power costs, in view of the fact that a proper selection of solvent permits the absorption and freezing within ordinary temperature range where the thermal cycle can be supplied simply with water cooling. Second, since the disengagement upon freezing is practically quantitative, it is possible to carry out the cycle at ordinary pressures without costly compression and obtain high product efficiency. Third, since the degassing cycle occurs at the freezing point of the solvent and may be completed with the solvent entirely in the solid phase, the vapor pressure of the solvents is low and solvent losses are minimized. Many other advantages will be apparent to one experienced in the art.

The composition of the acetylene-containing gas is immaterial. As in processes of the prior art, solvents suitable for this invention selectively absorb acetylenic compounds and to a lesser degree other unsaturated compounds. Typical mixtures of acetylene with hydrogen and other hydrocarbon gases such as might be produced in a pyrolysis or arc acetylene processes may be practically employed. Obviously, it may be applied to the storage of pure acetylene.

It is apparent that many widely different embodiments of this invention may be made without departing from the spirit and scope thereof, and, therefore, it is not intended to be limited except as indicated in the appended claims.

We claim:
1. Process for enriching acetylene which comprises dissolving impure acetylene gas in dioxane at a temperature between 5° C. and 15° C. and liberating enriched acetylene by freezing the dioxane.

2. Process for enriching acetylene which comprises continuously passing a solvent therefor through an absorption zone, continuously passing impure acetylene gas through said absorption zone, continuously freezing the effluent solvent from the absorption zone whereby enriched acetylene is liberated, continuously thawing the solvent and continuously recirculating the solvent through the absorption zone.

WILLIAM H. HAMILL.
RICHARD R. VOGT.